Patented Dec. 3, 1940

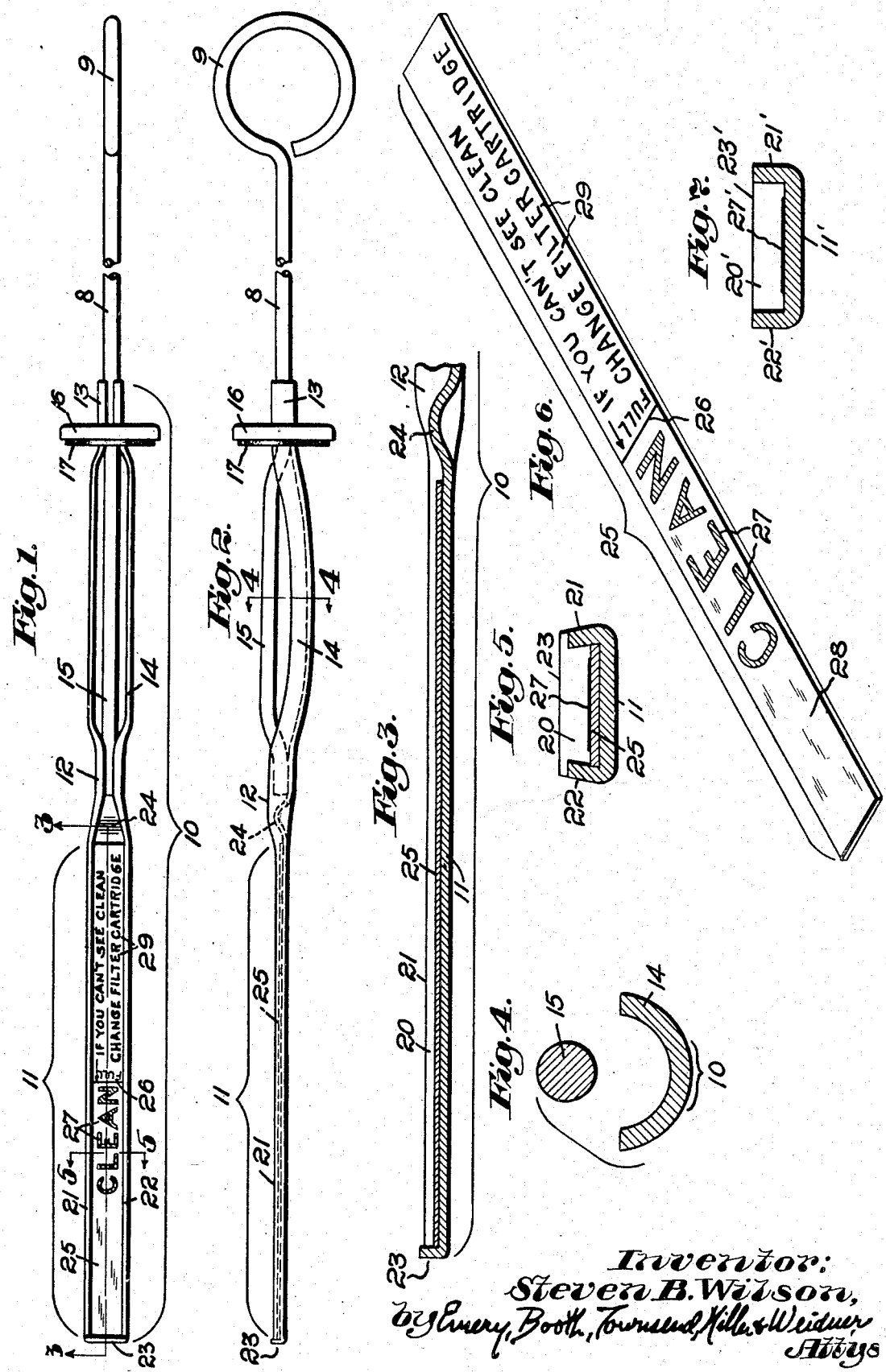

2,224,123

UNITED STATES PATENT OFFICE 2,224,123

CLARITY INSPECTOR FOR LUBRICATING OIL

Steven B. Wilson, Newton, Mass., assignor to Fram Corporation, a corporation of Rhode Island Application March 4, 1939, Serial No. 259,855

6 Claims. (Cl. 88—14)

My present invention relates to means for inspecting or measuring lubricating oil, particularly as to its clarity, as indicative of its condition as to cleanness or contamination. It aims to provide a simple, convenient and efficient device for the purpose, which will of a substantial certainty be regularly inspected. In certain respects this invention improves on that of my copending application, Serial No. 109,003 now Patent No. 2,176,618, dated October 17, 1939.

In the drawing representing by way of example certain embodiments of the invention, Fig. 1 is a plan of one form of gauge or stick incorporating the invention;

Fig. 2 is a side elevation of said device;

Fig. 3 is an enlarged longitudinal section as on the line 3—3 of Fig. 1;

Figs. 4 and 5 are enlarged cross sections on the lines 4—4 of Fig. 2 and 5—5 of Fig. 1 respectively;

Fig. 6 shows in perspective and on a large scale an indicator plate for use with a gauge stick such as that of Figs. 1 to 5; and Fig. 7 is a view similar to Fig. 5, showing a modification.

As more fully explained in my earlier application, some convenient, certain and quickly readable means is desirable for determining the clarity condition of the oil in lubricating systems of internal combustion engines and other organizations using fluid lubricant. This is particularly important in oil systems having a filter for the oil in which the filtering means should periodically be given attention, as by changing a filter cartridge or other part, or the filter as a whole, promptly when the oil reaches a predetermined degree of darkening contamination, generally short of blackness or opacity. Such means is also desirable for non-filtering systems, to indicate for a change of the oil.

Lubricating systems such as referred to commonly are equipped with oil quantity gauges, automotive engines, for example, having a rod or dipstick removably inserted into the oil chamber of the crank case through an aperture provided for the purpose. While my oil quality gauge or inspector may be constituted as a separate device, preferably and in the illustrated examples it is combined with the quantity gauge or dipstick, desirably in such manner that the quality determining means is viewed substantially of necessity whenever a reading of the quantity indication is taken.

Referring to the drawing in more detail, the oil inspector device comprises a supporting and manipulating portion or handle 8, illustrated as a rod or wire, generally steel or other metal, having its outer end formed into a grip 9. The lower part or element of the device, indicated as a whole by the numeral 10 and including a blade portion 11 for immersion in the oil, is herein formed of a separate piece or strip of metal, preferably of a relatively soft steel or other metal or alloy, enabling it readily to be machined, stamped or otherwise worked into a formation such as herein illustrated by way of example; see particularly Figs. 3 to 5.

Adjacent the handle element 8 the lower part 10 is bowed laterally, as clearly seen in the enlarged section, Fig. 4. The inner end of the supporting member 8 is set into the trough formation thus provided and the edges of the part 10 are firmly crimped onto it at spaced points, as indicated at the lower point 12 and the upper point 13 respectively, Figs. 1 and 2.

An upper or outer portion of the member or element 10 and the adjacent portion of the handle member 8 are offset laterally and oppositely, in a general manner as best seen in Figs. 2 and 4, to provide integral spring members 14 and 15. These spring members 14, 15 are adapted to be compressed in entering the dipstick into its supporting aperture in an engine crank case or other part and to engage yieldably with the aperture walls, to hold the stick in position. Such spring means may be otherwise formed in some instances.

The stick device desirably also is provided with a combined stop and cap 16 having a gasket or washer 17 at its lower or inner face. Said member 16 may be in the form of a metal or other disk fitted on the crimped portion 13 of the stick part 10. It serves to position the stick or gauge device longitudinally, limiting the extent of its insertion, and also closing the gauge aperture in the crank case or the like.

In order to insure that the gauge or dipstick will take and retain an adequate quantity of the oil for inspection purposes, and to provide for distributing the oil substantially uniformly and to a predetermined or constant depth over the indicating area to be examined, the stick is provided with an oil dipping and receiving or retaining formation 20 in the nature of a flat trough, elongated pocket or open channel, such as best seen for example in Figs. 3 and 5, which figures are substantial enlargements and partially diagrammatic. This oil retaining formation may be provided by upsetting the lateral and end edges of the stick part 10, at least along a major part of the oil-immersible blade portion 11 thereof, to form side walls 21, 22 and a lower end wall 23. Said method of formation is facilitated by the use of a relatively soft metal for said part 10, as above suggested. Said oil pocket or cup may be otherwise formed, as by milling one face of the blade 11 to provide said low retaining walls.

Referring particularly to Fig. 3, the end wall 23 is of sufficient height, permissibly a bit higher than the side walls 21, 22, to insure that an appreciable quantity of the oil is trapped and dipped out by the stick when it is withdrawn for inspection. Actually this quantity may be but a few drops, but it is in any case adequate to form a thin layer or film of oil over the bottom face or wall of the oil pocket, recess or chamber 20, where the quality indicating means to be described is located. An upper or outer end wall for the oil-film chamber 20 may be provided by upsetting the material of the blade, or leaving a transverse raised portion thereof as indicated at 24, or the inner end of the handle portion 8 may provide such upper end wall. The dimensions, particularly the vertical dimensions, of the walls 21, 22, 23 are somewhat exaggerated in the drawing, to give a clear understanding of the invention, which contemplates the provision of means on the dipstick for presenting thereon in position to be observed a substantially regular or standard and uniform layer or film of the oil, preferably of a depth appreciably greater than a true monomolecular film.

The recess or trough formation 20 also provides means for readily incorporating on the dipstick an indicator strip or plate 25 such as represented separately, and on a large scale, in Fig. 6.

Referring to Fig. 6, the strip 25 may be metal or other material, for example a terne plate, having a surface suitable for the reception of lithographing, printing or like visually modifying formation. At the appropriate point the strip 25 may be marked with a quantity index, such as the line and legend "Full," as indicated at 26. Below this quantity index, in the illustrated example, and hence on the portion normally immersed in the oil, the strip has applied to it means for visually indicating or signaling as to whether the oil condition, with respect to clarity or contamination, is satisfactory or otherwise.

Said means comprises a distinctive surface formation which may be and herein is shown as similar in character to that of my copending application, comprising in this example the lettered indicia "Clean," as indicated at 27. Said clarity condition indicating means 27 visually modifies the portion of the stick upon which it is located, being predeterminedly made of such light-reflectivity as to render it visually determinative of the clarity condition of a film or layer of oil covering it. As fully explained in my said earlier application, there is for any particular installation and oil a condition, generally substantially short of opacity, which is significant of dangerous contamination of the oil. This critical stage may readily be determined upon by the engine manufacturer or the filter maker, for any particular oil. The oil clarity indicating or signaling means 27 is correspondingly given such a light-reflectivity, usually with the use of coloring, that it will be obscured, that is, rendered substantially illegible or unintelligible when covered by the captured film or layer of the oil, of the standard thickness as provided by the described oil retaining formation 20, when the clarity of that oil has been impaired to that degree, generally short of opacity, predetermined as significant or critical for the particular operating conditions. It is readily visible, however, through a covering oil layer, of the described standard thickness, of any clarity preceding said dangerous predetermined minimum stage.

Said means 27 is thus visually indicative of the presence or absence of that minimum oil clarity at which the oil system requires corrective action, such as a change of the filter cartridge. It may be of any desired form and area relative to that of the oil-immersible portion of the stick, including any substantial surface area or spot adequate readily to be apparent as an indicator. It will also be understood that the quality indicating means 27 may be located in an oil chamber or portion thereof at any convenient part of the stick, not necessarily below the normal "full" level of the oil, the captured oil being enabled to flow to or be received by and to cover said means on manipulation of the stick.

With various different lubricating systems and engines, and depending also somewhat on the type of filter means, if any, the light reflecting characteristics, including the coloring, of the indicating means 27 may be substantially varied. If the oil normally is itself substantially clear or colorless and is to be maintained practically in that condition, with very little dirtying, the indicating means 27 may be of a relatively high light-reflectivity or of a comparatively light coloring or tint, such for example as a canary or other light yellow. For other oils and installations, and depending on the degree of dirtying determined as safe for continued operation, the light reflecting character of said means may be modified, as by using a darker color or otherwise varying its reflectivity. The different installations may make appropriate any of the various intermediate and darker shades and tints up to and including in some instances a dark brown or other color or even a black or substantially black formation.

Any remaining area of the oil-receiving portion carrying the indicating means 27, aside from the latter, desirably is of a contrasting reflectivity or color. A reading generally is facilitated by providing a relatively light-colored section 28 adjacent the somewhat darker colored indicia 27. Such light colored section may consist simply of the normal surface of the metal, such as steel or other "white" metal or alloy, or a white or other light coloring may be provided, applied by lithographing or otherwise. This may conveniently be done simultaneously with the application of the indicating means 27.

The provision of a separate strip or plate 25 bearing the indicating means facilitates the formation of the indicia and light reflecting or colored areas thereon by the lithographing process. Any preferred method of printing or other application of the surface modifying formations may be employed, however, as in my earlier application, such that the resulting formations will remain serviceable through long subjection to the engine lubricating oil under the temperature and operating conditions found in the crank cases of internal combustion engines.

Referring still to Fig. 6, another portion of the strip or plate 25, herein above the quantity index 26 and the clarity indicator 27, cooperatively carries some suitable associated legend or instruction, as indicated at 29, to inform as to the specific change to be made in response to an indication therefor by the indicating means 27. In the illustrated example, particularly for use with a lubricating system having a filter with a replaceable filter unit or cartridge, the wording may be "If you can't see 'Clean', change filter cartridge." Some such designation, in cooperation with the quality indicating means, thus informs as to the appropriate change, alteration or corrective act to be performed. Other such informative indications might direct that the filter be cleaned, or the oil changed or a new filter assembly installed, whatever may be appropriate to the particular case. As an aid in focusing the observer's attention on the instructions the area bearing them may be distinctively or contrastingly colored in any attractive manner.

Referring now to Figs. 1 to 3 and 5, the indicator strip 25 is disposed flatwise on the bottom of the oil recess 20 and there held in place in any suitable manner. Where the strip and the stick are of metal the strip may be spot welded to the supporting part, herein the blade portion 11. If desired the oil retaining walls 21, 22, 23 may be bent slightly inward, as seen in Fig. 5, after insertion of the plate, retaining it in position. The illustrated construction also permits of replacement and renewal of the indicator strip or the substitution of a different strip appropriate to some changed condition at its point of use.

In some instances the quantity index, such as represented at 26, may be at the opposite face of the blade, or may be omitted where an indication of clarity condition alone is desired. In other instances the quality or clarity-condition indicating means 27 such as the lettering "Clean" may be so formed that some portion thereof may serve also as a quantity indicia.

In Fig. 7 I have illustrated a modification in which the surface formations including the indicating means 27, the quantity index 26, the background 28 and any operating instructions 29 are lithographed or otherwise applied directly on a face of the stick, herein at the blade portion 11'. As in the previous instance this blade portion is formed with a shallow trough or oil-receiving chamber 20' defined by the low side walls 21', 22' and an inner end wall 23'. The indicating means 27' and any other surface modifications are applied directly to the material of the stick, with said means 27' on the floor of the oil chamber 20', by lithographing, printing or other manner suitable to give them the desired capacity to stand immersion in the heated oil of engine-crank cases and the like. The oil recess or chamber 20' need not extend substantially beyond the condition indicator 27', at whatever point the latter is located. This applies also to the embodiment previously described in connection with Figs. 1 to 5. In either instance the oil-immersible portion 11 of the stick is formed with means to trap a quantity of the oil and said or other portion of the stick has an oil receiving or inspecting chamber or retaining formation communicating with said means. Such chamber or formation in turn is provided with the condition indicating means of the visual character described.

From the foregoing it will be understood that the improved oil quality gauge or inspector of my invention includes means whereby a standard film or layer of oil to be inspected is captured on the gauge or dipstick. When the stick is withdrawn for an inspection any excess oil is allowed to run or drop off. By then holding the stick in a substantially horizontal position the small quantity of oil retained in the chamber 20 is evenly distributed over the indicating area, to a standard depth as determined by the chamber walls. Under the average or normal light assumed, as at modern filling stations, uniformity in operation is substantially assured.

My invention is not limited to the exemplary embodiments as herein illustrated or described and I set forth its scope in my following claims.

I claim:

1. An oil clarity condition inspecting device for lubricating systems comprising a stick having a supporting portion and a body including a lower portion to be immersed in the oil, an oil-inspecting chamber on the stick body having a floor and lateral walls adapting it to hold for inspection, in horizontal position, a thin layer of oil of uniform depth, and a distinctive indicating area on the chamber floor of such light-reflective property as to be obscured by oil thereon of a predeterminedly impaired clarity, said chamber lateral walls having a height calculated with reference to said light-reflective property of said indicating area to retain an insured minimum depth of oil to afford said obscuring effect with oil of said predeterminedly impaired clarity, and said walls limiting the maximum oil depth to that which is non-obstructive of visibility of said area with operatively clean oil.

2. An oil clarity condition inspecting device for lubricating systems comprising a stick having a supporting portion and a body including a lower portion to be immersed in the oil, an oil-inspecting chamber on the stick body having a floor and lateral walls adapting it to hold for inspection, in horizontal position, a thin layer of oil of uniform depth, laterally projecting means at the lower end of the stick body for trapping and withdrawing a quantity of the oil in which said end is immersed, said means communicating with the oil-inspecting chamber to provide for flow of the oil to the latter in the horizontal position of the stick, and surface means on the floor of the chamber to afford visual indication as to the oil clarity by its condition as to visibility through the overlying oil in said chamber, said chamber lateral walls having a height calculated with reference to the light-reflective property of said surface means on the chamber floor to retain an insured minimum depth of oil to afford said obscuring effect with oil of said predeterminedly impaired clarity, and said walls limiting the maximum oil depth to that which is non-obstructive of visibility of said area with operatively clean oil.

3. An oil dipstick comprising a supporting part and an inspecting part including a portion to be immersed in the oil, said inspecting part formed of a metal of workable softness and having its lower end upset to provide a dipper-like formation to catch a quantity of oil and having lateral edge portions upset to form an oil inspecting chamber, as facilitated by the workable softness of the metal of said inspecting part, said supporting part of the stick being separately formed of a relatively harder and resilient material and fixed to the upper end of the inspecting part, laterally adjacent sections of said two parts being offset, such section of the supporting part by reason of said resiliency of its material being effective as a spring holding element engageable with the walls of an aperture in which the stick is to be positioned, and said upset portions of the inspecting part projecting sufficiently to guard against damaging contact of the floor of said inspecting chamber with such walls of a stick-positioning aperture.

4. An oil dipstick comprising a supporting part and an inspecting part including a portion to be immersed in the oil, said inspecting part having thereon an oil-display chamber, and a thin flat plate on the floor of the chamber presenting a distinctive indicating area of a predetermined light-reflectivity, said chamber having a depth to accommodate said plate and to confine laterally over its indicating area a layer of oil of an extent and depth adequate to present sufficient of the oil contaminating matter to obscure that area when the clarity of the oil is impaired to a degree to be indicated, such chamber limiting said oil depth to a maximum through which said indicating area, having regard to its said light-reflectivity remains readily visible while the oil of said layer is acceptably clean.

5. An oil dipstick comprising a supporting part and an inspecting part including a portion to be immersed in the oil, said inspecting part formed of a metal adapted for stamping and having its edge portions upset to form a trough-like oil-inspecting chamber, said supporting part of the stick being separately formed of a wire-like resilient metal stock and being fixed to the upper end of the inspecting part, laterally adjacent sections of said two parts being offset, such section of the supporting part by reason of its resilient character providing spring holding means engageable with the walls of an aperture through which the stick is to be inserted, and said upset portions of the inspecting part being adapted to space the floor of said oil-inspecting chamber from such aperture walls during insertion and removal of the dipstick.

6. An oil dipstick according to claim 5 including a separately formed indicating strip applied flatwise on the floor of the oil-inspecting chamber, the chamber-forming upset edge portions of the inspecting part of the stick being inturned to hold said strip in place.

STEVEN B. WILSON.